(No Model.) 3 Sheets—Sheet 1.

H. E. OLSTAD.
TIRE UPSETTING MACHINE.

No. 559,197. Patented Apr. 28, 1896.

WITNESSES:
Edward Thorpe
J. H. Caplinger

INVENTOR
H. E. Olstad
BY
Munn & Co
ATTORNEYS.

(No Model.) 3 Sheets—Sheet 2.
H. E. OLSTAD.
TIRE UPSETTING MACHINE.
No. 559,197. Patented Apr. 28, 1896.
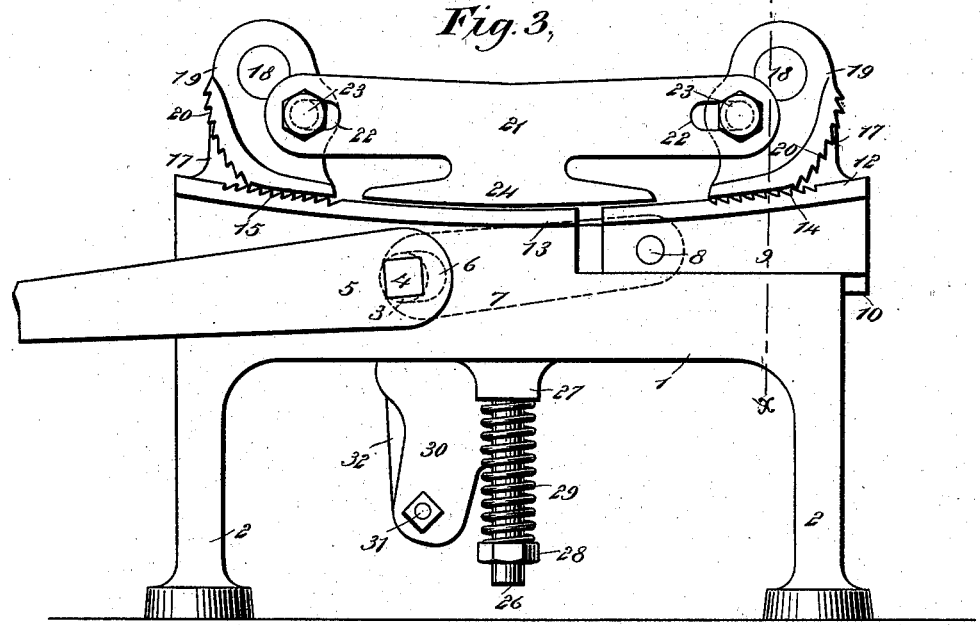
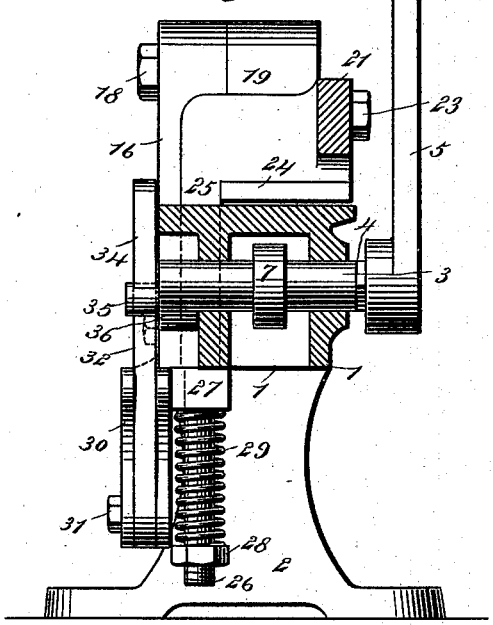
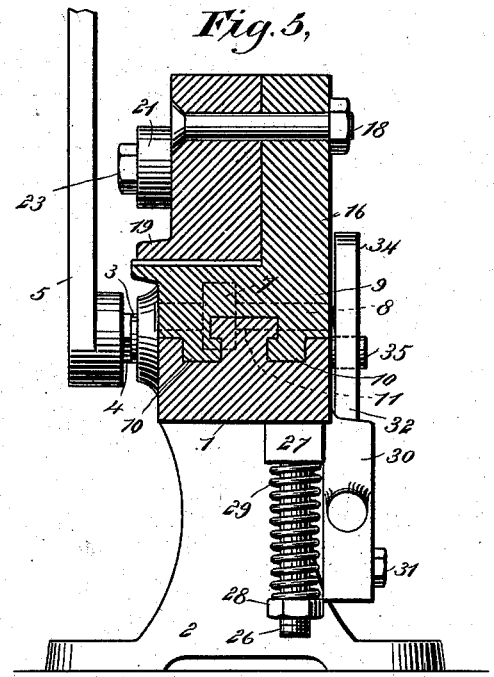
WITNESSES:
Edward Thorpe
J. L. Taplinger
INVENTOR
H. E. Olstad
BY
Munn & Co.
ATTORNEYS.

(No Model.) 3 Sheets—Sheet 3.

H. E. OLSTAD.
TIRE UPSETTING MACHINE.

No. 559,197. Patented Apr. 28, 1896.

WITNESSES:
Edward Thorpe

INVENTOR
H. E. Olstad
BY
Munn & Co
ATTORNEYS.

UNITED STATES PATENT OFFICE.

HANS E. OLSTAD, OF SIOUX FALLS, SOUTH DAKOTA.

TIRE-UPSETTING MACHINE.

SPECIFICATION forming part of Letters Patent No. 559,197, dated April 28, 1896.

Application filed July 6, 1895. Serial No. 555,153. (No model.)

*To all whom it may concern:*

Be it known that I, HANS E. OLSTAD, of Sioux Falls, in the county of Minnehaha and State of South Dakota, have invented a new and Improved Tire-Upsetting Machine, of which the following is a full, clear, and exact description.

This invention relates to certain improvements in machines for upsetting or shrinking tires and the like, and has for its object to provide a device of this character of a simple and inexpensive construction which shall be adapted to grip and hold the tire to be shrunk tightly while the shrinking devices are being operated and in such a way that the employment of wedges and equivalent devices is entirely avoided.

The invention consists in a tire-upsetting machine comprising a frame, movable and fixed jaws carried thereon to engage and hold the tire during the upsetting or shrinking operation, means for opening and closing said jaws to cause the same to receive and hold the tire, and means for moving the jaws toward one another to effect the upsetting or shrinking.

The invention also contemplates certain novel features of construction and combinations and arrangements of parts, whereby certain important advantages are attained and the device is made stronger, more convenient, and otherwise better adapted for use than other similar machines heretofore devised, all as will be hereinafter fully set forth.

The novel features of the invention will be carefully defined in the claims.

Reference is to be had to the accompanying drawings, forming a part of this specification, in which similar characters of reference indicate corresponding parts in all the views.

Figure 1:
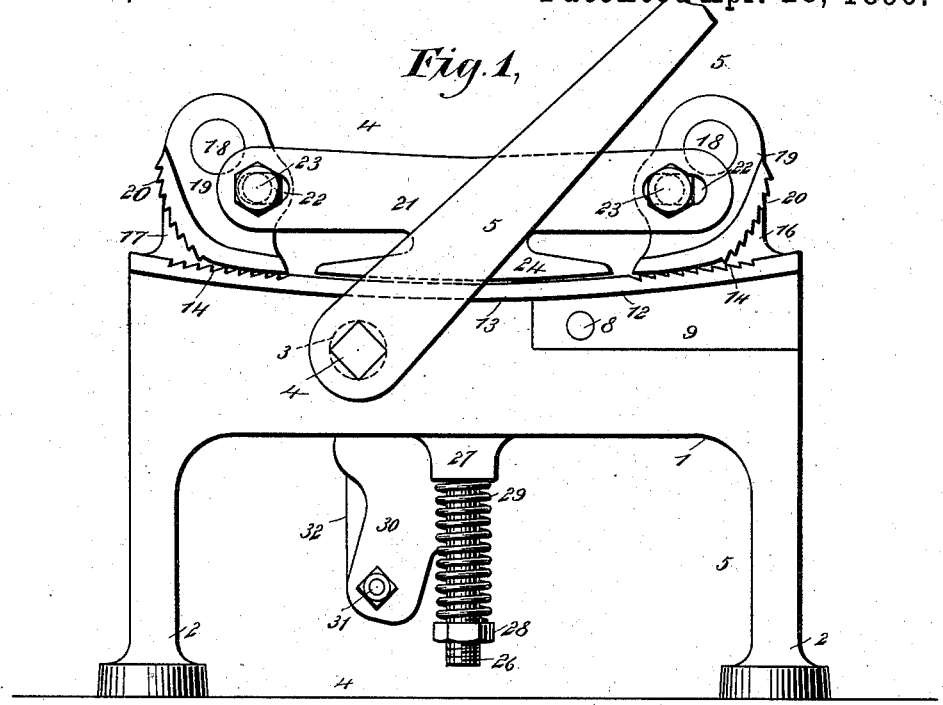
Figure 2:
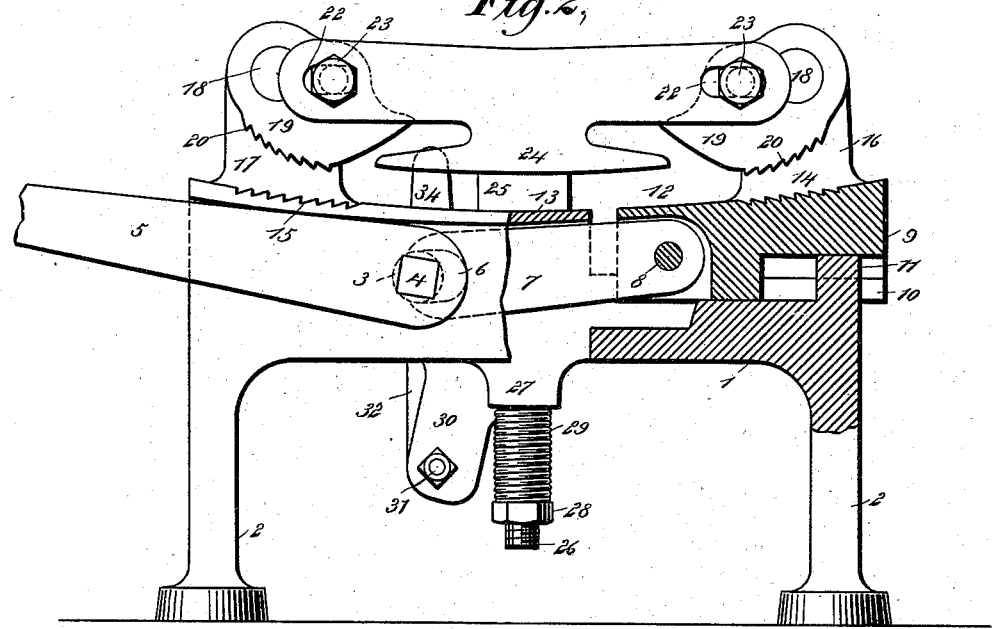
Figure 6:
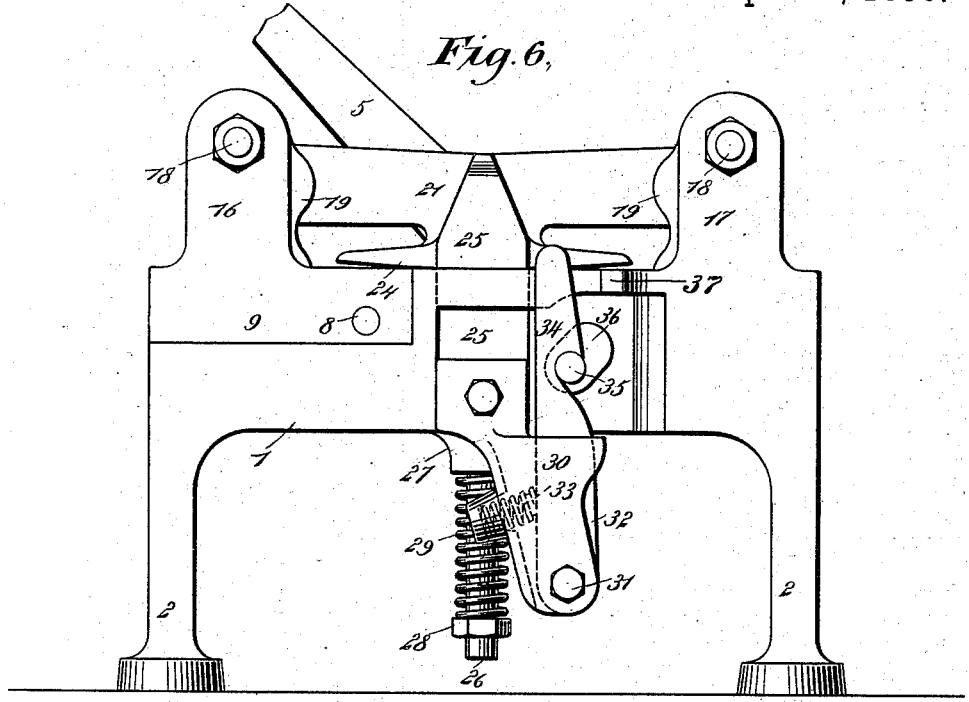
Figure 7:
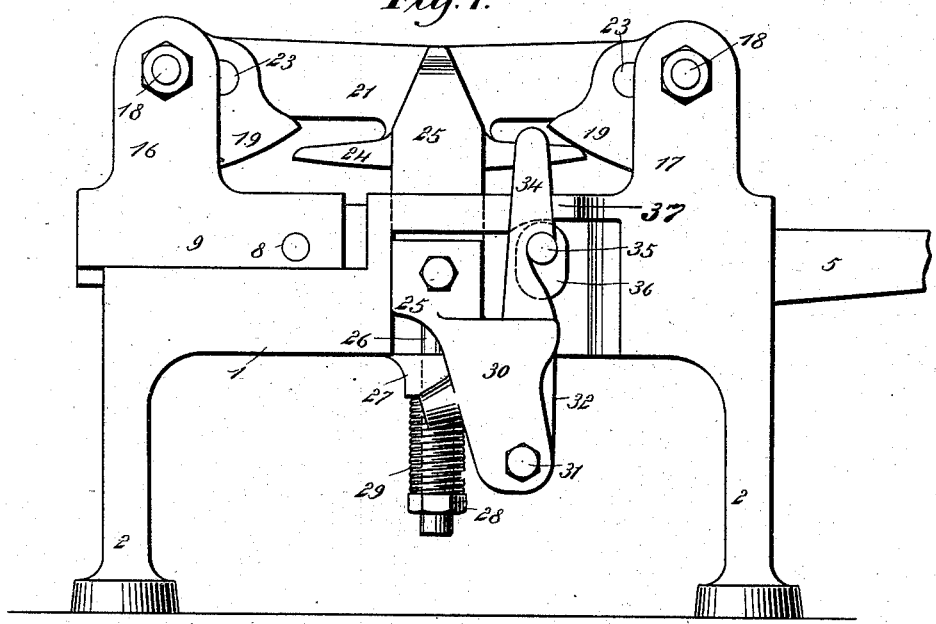

Figure 1 is a side elevation of a tire-upsetting machine constructed according to my invention; and Fig. 2 is a similar view showing the jaws in their opened position, the lower member of the movable jaw being shown in section to better illustrate its actuating devices. Fig. 3 is a view similar to Fig. 1, but showing the position of the parts when the tire has been inserted and the shrinking devices are about to be actuated. Fig. 4 is a vertical section taken through the device in the plane of the axis of the operating-shaft; and Fig. 5 is a similar section taken in the plane indicated by the line $x\ x$ in Fig. 3, showing the construction of the movable jaw. Fig. 6 is a view showing the rear side of the machine, the jaws being in their closed position, as seen in Fig. 1; and Fig. 7 is a view similar to Fig. 6, but showing the parts in their open position ready for the insertion of the tire to be shrunk.

In the views, 1 represents the frame of the device constructed of any material of suitable form and strength and provided with legs 2, whereby it may be secured in place to the floor or bench.

3 represents a shaft journaled in the frame 1 and extending transversely thereof, being provided with a squared end 4, adapted to receive a handle 5 in a well-known way.

The frame 1 is provided with a hollow in its under side through which the shaft 3 extends, and said shaft is provided within said hollow with an eccentric 6, engaging an aperture in one end of an eccentric rod or link 7, the opposite end of which is pivoted, as seen at 8 in the drawings, to the body 9 of the movable jaw of the device, said body being provided with parallel guide-flanges 10, projecting from its under side in position to engage a guide 11, mounted on the frame 1, as seen in Fig. 5. On its upper face the body 9 of the movable jaw of the device is provided with a flattened surface 12, slightly curved and arranged to correspond to the curved upper face 13 of the frame 1, which constitutes the fixed jaw of the device, and said faces 12 and 13 are provided near their opposite ends with series of rack-teeth 14 and 15, respectively, adapted to engage and hold the tire when the same is in place.

The respective main movable and fixed jaws are provided near their opposite ends with upwardly-extending arms 16 and 17, at the upper ends of which are pivoted, as seen at 18 in the drawings, swinging segment-racks or clamping-jaws 19, having toothed eccentric faces 20 arranged opposite the toothed faces of the main fixed and movable jaws and arranged to bear on the upper or inner face of the tire when the same is in place.

The clamping-jaws or segment-racks 19 are tied or connected together by means of a beam or cross-piece 21, extending between them and provided at its opposite ends with slots 22 to receive pins or bolts 23, set in the respective racks 19, the central portion of said beam or cross-piece 21 being provided with a depending shoe or foot 24, having a curved under side arranged opposite to the curved upper face 12 of the frame 1 and adapted to bear on the upper or inner face of the tire when the same is in place between the said swinging racks 19.

The central portion of the beam or cross-piece 21 is also provided with a depending vertical shank or stem 25, arranged to slide in a way formed vertically in the frame 1 at the rear of the curved upper face 12 thereof, and said shank or stem 25 is provided with a threaded extension 26, alined with and projecting from its lower end, said extension being arranged to slide through a perforated lug or guide 27 on the lower part of the frame 1 and being provided at its extremity with a nut 28 screwing on it, between which nut and the said guide 27 is held a spiral spring 29, adapted to hold the shoe 24 normally pressed downward in position to clamp the tire and hold the same securely in position.

On its outer side the shank or stem 25 of the beam or cross-piece 21 is provided with a bearing-piece or bracket 30, having a chamber formed in it, at the lower end of which chamber is pivoted on a bolt or pin 31 a latch 32, arranged in the chamber in the bracket 30 and provided at its upper end with a hook or projecting portion 34, adapted to engage a crank or wrist pin 35 on a crank-arm 36 on the end of the shaft 3 opposite the handle 5, with which pin 35 said hook is normally pressed into engagement by means of a spring 33, held in the chamber in the bracket 30 in position to press against the side of latch 32 opposite to said hook 34, as clearly seen in Fig. 6.

In operation the handle 5 is first turned from the position seen in Fig. 1 to that seen in Fig. 2, this operation serving to slide the body 9 of the main movable jaw away from the main fixed jaw on the frame 1 by means of the connection between said body and the crank or eccentric 6, and also serving to engage the wrist or crank pin 35 with the hook 34 of the latch 32, so as to lift the cross-piece or beam 21 and its shoe 24, at the same time compressing the spring 29 and swinging the racks 19 on their pivots 18 toward each other in such a way that their eccentric surfaces 20 are caused to be separated from the engaging faces of the fixed and movable jaws, so as to permit the tire to be shrunk or set to be inserted between said lower fixed and movable jaws and the respective swinging racks which constitute upper clamping-jaws.

The jaws being in their open position, the tire is inserted and the handle 5 is further moved, so as to turn the shaft 3 and disengage the crank-pin 35 thereon from the hook 34 of the latch 32, which engages and is stopped against further movement with said crank-pin 35 by a shoulder or abutment 37, formed on frame 1 and extending into the path of said latch, as seen in Figs. 6 and 7.

As the wrist or crank pin 35 is disengaged from hook 34 the spring 29 acts to throw down the cross-piece 21, so that its depending shoe 24 comes to bear forcibly on the upper or inner face of the tire held in the device, and at the same time the racks 19 are swung on their pivotal points 18, so as to also engage the upper or inner face of the tire on the opposite side of the shoe 24 and opposite to the respective faces 14 and 15 of the respective main sliding and fixed jaws.

The handle 5 is now turned in the reverse direction, so that the eccentric or crank 6, by means of its connection with the movable or sliding jaw 12, acts to slide said jaw on the frame 1 from the position seen in Fig. 2 to that seen in Fig. 1, whereby the heated tire is shrunk or upset between the point where said sliding jaw 12 and the swinging jaw 19, carried thereby, and the point where the teeth 14 of the fixed jaw and the teeth 20 of the corresponding jaw 19 engage the tire. This movement of the handle 5 also serves to force back the latch 32 and engage the wrist or crank pin 35 under the hook 34 thereof, said latch being free to swing on its pivot 31 to accommodate such engagement. When it is desired to remove the tire from the machine, the handle 5 is moved over in the direction it was first moved, so that the shoe 24 and cross-piece or beam 21 are raised, and by the same movement the racks 19 will be lifted or swung on their pivots toward each other, so as to release the tire and permit the ready removal of the same.

The tire setting or shrinking machine constructed as above described is extremely simple and inexpensive, and is, further, very convenient for operation, being adapted to clamp and hold the tire securely in position both before and after the operation of shrinking, whereby the use of wedges is dispensed with and the liability of the tire being damaged is prevented.

The arrangement of the main movable or sliding jaw to carry the corresponding swinging clamping-jaw or rack and to move in unison therewith, said parts being actuated by the same mechanism, also affords a secure means for clamping the tire during the shrinking operation, and the part of the tire operated upon being substantially covered by the clamping devices the bending of the same is prevented and shrinking is insured. The shoe 24 being held down by spring-pressure, permits the shrinking of the tire to take place beneath it.

Having thus described my invention, I claim as new and desire to secure by Letters Patent—

1. In a tire-upsetting machine, the combination of a frame, two main jaws thereon, one of said jaws being movable, two clamping-jaws arranged opposite the respective main jaws, a beam connecting the clamping-jaws, a spring for actuating said jaws, an operating-handle, and a connection between the said beam and the movable main jaw and said handle, adapted to hold the clamping-jaws out of operation, substantially as set forth.

2. In a tire-upsetting machine, the combination of a frame having main jaws one of which is movable, clamping-jaws for clamping the tire during the shrinking operation, a spring-actuated shoe arranged to engage the tire and hold the same elastically in position to be shrunk, a beam connecting said shoe with the clamping-jaws, operating mechanism for the movable main jaw, and a latch device connected to said shoe and arranged to engage the said mechanism to hold the said shoe and clamping-jaws out of operation, substantially as set forth.

3. In a tire-upsetting machine, the combination of a frame having two main clamping-jaws, one of which is movable, two clamping-jaws arranged opposite the respective main jaws, a beam connecting said clamping-jaws, a spring connected to the beam and adapted to throw the clamping-jaws into clamping position, operating mechanism for the movable main jaw, and a latch device connected to the beam and arranged to engage and be actuated from said mechanism, for operating the auxiliary jaws, substantially as set forth.

4. In a tire-upsetting machine, the combination of a frame having two main jaws, one of which is movable, two clamping-jaws arranged opposite the respective main jaws, a beam connecting the clamping-jaws, a spring connected to said beam and adapted to throw the clamping-jaws into operation, operating mechanism for the movable main jaw, and a latch device arranged to engage said mechanism, for throwing the clamping-jaw out of operation against the tension of said spring, substantially as set forth.

5. In a tire-upsetting machine, the combination of a frame having two main jaws, one of which is movable, two clamping-jaws arranged opposite the respective main jaws, a beam connecting the clamping-jaws, means for moving said beam in one direction, a shaft mounted in the frame and connected to the movable main jaw to operate the same, a crank on said shaft, and a latch pivotally connected to the beam and adapted to be engaged by said crank to move the beam in the opposite direction, substantially as set forth.

6. In a tire-upsetting machine, the combination of a frame having two main jaws, one of which is movable, two clamping-jaws arranged opposite the respective main jaws, a beam connecting the clamping-jaws, a shaft mounted in the frame and connected to the movable main jaw to operate the same, a crank on said shaft having a crank-pin, a latch pivotally connected to the beam and provided with a hook to be engaged by said crank-pin to move said beam in one direction, means for disengaging the hook from the crank-pin, and means for moving said beam in the opposite direction, substantially as set forth.

HANS E. OLSTAD.

Witnesses:
NELS ARNSTON,
O. E. LASSESEN.